United States Patent
Kouno et al.

(10) Patent No.: US 9,643,496 B2
(45) Date of Patent: May 9, 2017

(54) POWER CONVERSION APPARATUS FOR VEHICLE AND VEHICLE

(71) Applicant: KABUSHIKI KAISHA TOSHIBA, Minato-ku, Tokyo (JP)

(72) Inventors: Yuusuke Kouno, Fuchu Tokyo (JP); Yosuke Nakazawa, Kunitachi Tokyo (JP); Kentaro Suzuki, Hachioji Tokyo (JP); Ryuta Hasegawa, Hino Tokyo (JP); Tomoyuki Makino, Iruma Saitama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 426 days.

(21) Appl. No.: 14/479,204

(22) Filed: Sep. 5, 2014

(65) Prior Publication Data

US 2014/0375121 A1 Dec. 25, 2014

Related U.S. Application Data

(63) Continuation of application No. PCT/JP2012/003777, filed on Jun. 11, 2012.

(30) Foreign Application Priority Data

Mar. 16, 2012 (JP) .................................. 2012-060300

(51) Int. Cl.
*B60L 3/00* (2006.01)
*B60L 11/00* (2006.01)
(Continued)

(52) U.S. Cl.
CPC ............. *B60L 11/005* (2013.01); *B60L 3/003* (2013.01); *B60L 3/04* (2013.01); *B60L 11/1812* (2013.01);
(Continued)

(58) Field of Classification Search
CPC .......... B60L 11/005; B60L 3/003; B60L 3/04; B60L 11/1812; B60L 11/1816; H02M 7/217
See application file for complete search history.

(56) References Cited

U.S. PATENT DOCUMENTS

| | | | |
|---|---|---|---|
| 2010/0253295 A1* | 10/2010 | Tan | ........................ H02M 1/42 323/205 |
| 2013/0033912 A1* | 2/2013 | Wu | ........................ H02M 7/483 363/132 |

FOREIGN PATENT DOCUMENTS

| | | |
|---|---|---|
| JP | 2004007941 A | 1/2004 |
| JP | 2011120325 A | 6/2011 |
| JP | 2012044757 A | 3/2012 |

OTHER PUBLICATIONS

Korean Office Action (and English translation thereof) dated Jul. 1, 2016, issued in counterpart Korean Application No. 10-2014-7025393.

(Continued)

*Primary Examiner* — Jared Fureman
*Assistant Examiner* — Rafael Pacheco
(74) *Attorney, Agent, or Firm* — Holtz, Holtz & Volek PC

(57) ABSTRACT

According to an embodiment, a power conversion apparatus for a vehicle is provided with a single-phase two-level converter and a single-phase three-level converter. The single-phase two-level converter is composed of a capacitor, first to fourth controllable switching devices, diodes connected in antiparallel with the controllable switching devices, respectively. The single-phase three-level converter is composed of two series-connected capacitors, fifth to tenth controllable switching devices, diodes connected in antiparallel with the controllable switching devices, respectively. The single-phase two-level converter and the single-phase three-phase converter are connected in series at the (Continued)

AC input/output points. The single-phase two-level converter has smaller switching loss than the single-phase three-level converter, and the single-phase three-level converter has higher withstand voltage property than the single-phase two-level converter.

19 Claims, 12 Drawing Sheets

(51) Int. Cl.
    *H02M 7/217*     (2006.01)
    *B60L 11/18*     (2006.01)
    *B60L 3/04*     (2006.01)
    *H02M 7/483*     (2007.01)

(52) U.S. Cl.
    CPC ......... *B60L 11/1816* (2013.01); *H02M 7/217* (2013.01); *B60L 2240/525* (2013.01); *B60L 2240/527* (2013.01); *B60L 2240/529* (2013.01); *H02M 7/483* (2013.01); *Y02T 10/7005* (2013.01); *Y02T 10/7072* (2013.01); *Y02T 90/127* (2013.01); *Y02T 90/14* (2013.01)

(56) References Cited

OTHER PUBLICATIONS

Kouno, et al., "A Study on Small Single Phase Converter for Railway with SiC Power Devices", 2012 National Convention Record I.E.E. Japan, Mar. 5, 2012, p. 272.

\* cited by examiner

POWER CONVERSION APPARATUS FOR VEHICLE AND VEHICLE

CROSS-REFERENCE TO RELATED APPLICATION

This application is based upon and claims the benefit of priority from the prior Japanese Patent Application No. 2012-060300, filed on Mar. 16, 2012; the entire contents of which are incorporated herein by reference.

This application is a continuation application of International Patent Application No PCT/JP2012/003777, filed on Jun. 11, 2012.

FIELD

Present embodiments relate to a power conversion apparatus for a vehicle and a vehicle.

BACKGROUND

A converter of a power converter for Shinkansen is composed of a diode clamp type three-level circuit, in many cases.

On the other hand, recently a low loss device such as a silicon carbide device has been proposed. Accordingly, it is expected in future to miniaturize a converter, by applying a low loss device such as a silicon carbide device to the converter.

However, there is no device which can withstand a high voltage, in silicon carbide devices and so on provided at present. For this reason, the serialization of devices, or a multilevel configuration in which existing silicon devices and silicon carbide devices are combined are required. Out of the two measures, the serialization of devices has problems such as increase in resistance loss, increase in the number of devices, and necessity for balance control. For this reason, the multilevel configuration is practical under the present circumstances.

As a multilevel configuration, a flying capacitor system has been proposed, in which the number of switching devices for the number of output voltage levels is small. However, the relevant system causes the number of capacitors to be large.

As a multilevel configuration to suppress the number of capacitors, a diode clamp system has been proposed. In the diode clamp system, since a balance circuit for a filter capacitor voltage is required, there is a possibility that the volume thereof increases. In addition, there are a cascade system which AC input/output points of single-phase full bridge converters (inverters) are connected in series, and a gradation control system.

However, in the conventional technology, it is possible to withstand a high voltage, and the number of capacitors can be decreased, but the number of switching devices for the number of output voltage levels increases. Accordingly, it is difficult to miniaturize the apparatus.

DETAILED DESCRIPTION

According to an embodiment, a power conversion apparatus for a vehicle is provided with a single-phase two-level converter and a single-phase three-level converter. The single-phase two-level converter is composed of a capacitor, a first controllable switching device connected between one end of the capacitor and one AC input/output point, a second controllable switching device connected between other end of the capacitor and the one AC input/output point, a third controllable switching device connected between the one end of the capacitor and other AC input/output point, a fourth controllable switching device connected between the other end of the capacitor and the other AC input/output point, and diodes connected in antiparallel with the controllable switching devices, respectively. The single-phase three-level converter is composed of two series-connected capacitors, a fifth controllable switching device connected between one end of the two series-connected capacitors and one AC input/output point, a sixth controllable switching device connected between other end of the two series-connected capacitors and the one AC input/output point, a seventh controllable switching device connected between the one end of the two series-connected capacitors and other AC input/output point, an eighth controllable switching device connected between the other end of the two series-connected capacitors and the other AC input/output point, a bidirectional switch connected between a connection point between the two series-connected capacitors and the other AC input/output point in which a ninth controllable switching device and a tenth controllable switching device are connected in antiparallel with and in reverse polarities to each other, and diodes connected in antiparallel with the controllable switching devices, respectively. The single-phase two-level converter and the single-phase three-level converter are connected in series at the AC input/output points. The single-phase two-level converter has smaller switching loss than the single-phase three-level converter, and the single-phase three-level converter has higher withstand voltage property than the single-phase two-level converter.

Hereinafter, further embodiments will be described with reference to the drawings.

First Embodiment

Figure 1:
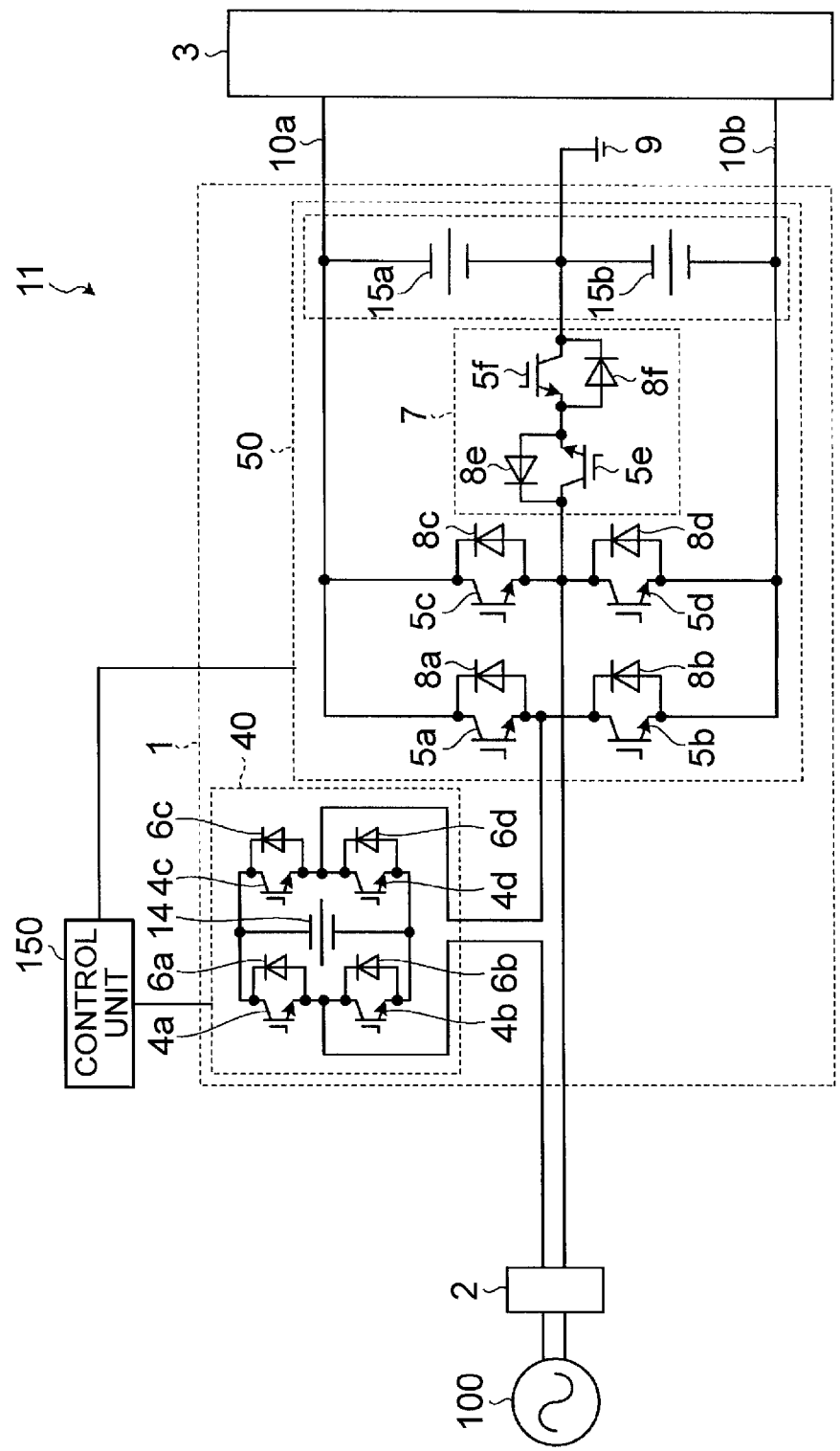
FIG. 1 is a diagram showing a configuration of a multi-level converter of a power conversion apparatus according to a first embodiment.

FIG. 1 is a diagram showing a configuration of a multilevel converter 1 of a power conversion apparatus 11 for a vehicle according to a first embodiment. As shown in FIG. 1, in the multilevel converter 1 according to the present embodiment, a single-phase three-level converter 50 and a single-phase two-level converter 40 are connected in series. And the multilevel converter 1 connects to an AC power source 100 of an electric power system and so on through a passive element 2 having an inductance component, converts a single-phase AC power into a DC power, and supplies the power to a main motor 3. In addition, the present embodiment does not limit a vehicle on which the power conversion apparatus 11 is loaded, but the power conversion apparatus 11 may be loaded on various vehicles.

A control unit 150 controls the single-phase three-level converter 50 and the single-phase two-level converter 40. In addition, the control unit 150 is provided inside the power conversion apparatus 11, and may be provided inside the multilevel converter 1.

The single-phase two-level converter 40 is a commonly-used single-phase converter, and is composed of switching devices 4a-4d, a capacitor 14, (reflux) diodes 6a-6d. The single-phase two-level converter 40 according to the present embodiment is composed of SiC (silicon carbide) devices. The single-phase two-level converter 40 utilizes SiC (silicon carbide) devices, and thereby can reduce switching loss.

The switching devices 4a-4c is self-turn-off switching devises. In addition, the switching device 4a is connected between one end of the capacitor 14 and one AC input/output point. In addition, the switching device 4b is connected between other end of the capacitor 14 and the one AC input/output point. The switching device 4c is connected between the one end of the capacitor 14 and other AC input/output point. The switching device 4d is connected between the other end of the capacitor 14 and the other AC input/output point.

The diode 6a is connected in antiparallel with the switching device 4a, the diode 6b is connected in antiparallel with the switching device 4b, the diode 6c is connected in antiparallel with the switching device 4c, the diode 6d is connected in antiparallel with the switching device 4d.

The single-phase three-level converter 50 has switching devices 5a-5f, two (filter) capacitors 15a, 15b which are connected in series, diodes 8a-8f. The capacitor 15a connects to a positive potential conducting wire 10a at the positive side, and to a neutral point 9 at the negative side. The capacitor 15b connects to the neutral point 9 at the positive side, and to a negative potential conducting wire 10b at the negative side. And the connection point of the switching devices 5c, 5d, 5e is made an AC voltage input/output point. And the switching devices 5c, 5d, 5e are connected from the AC voltage input/output point to the AC power source 100 of the electric power system and so on through the passive element 2.

The single-phase three-level converter 50 is provided with two legs. And the switching devices 5a-5f contained in the single-phase three-level converter 50 are self-turn-off switching devices.

One leg is composed of the two series-connected switching devices 5a, 5b. The switching device 5a is connected between the positive potential of the two series-connected capacitors 15a, 15b and one AC input/output point. The switching device 5b is connected between the negative potential of the two series-connected capacitors 15a, 15b and the one AC input/output point.

The other leg is composed of the two series-connected switching devices 5c, 5d. In addition, a bidirectional switching device 7 is connected to the two series-connected switching devices 5c, 5d, as described below. The switching device 5c is connected between the positive potential of the two series-connected capacitors 15a, 15b and other AC input/output point. The switching device 5d is connected between the negative potential of the two series-connected capacitors 15a, 15b and the other AC input/output point.

The two series-connected switching devices 5c, 5d are respectively connected between the positive potential and the other AC input/output point, and between the other AC input/output point and the negative potential.

The bidirectional switching device 7 is composed of the switching devices 5e, 5d which are connected in series and in reverse polarities, and the diodes 8e, 8f. And the bidirectional switching device 7 is connected between the potential of the neutral point 9 between the two series-connected capacitors 15a, 15b and the other AC input/output point.

In this circuit configuration, the numbers of the switching devices and the capacitors used in the single-phase three-level converter 50 are respectively 6 and 2, and thereby the number of the required components is small for the number of output voltage levels.

The diode 8a is connected in antiparallel with the switching device 5a, the diode 8b is connected in antiparallel with the switching device 5b, the diode 8c is connected in antiparallel with the switching device 5c, the diode 8d is connected in antiparallel with the switching device 5d. Furthermore, the diode 8e contained in the bidirectional switching device 7 is connected in antiparallel with the switching device 5e, the diode 8f is connected in antiparallel with the switching device 5f.

The single-phase two-level converter 40 according to the present embodiment is composed of silicon carbide (SiC) devices with little switching loss, or the like. In addition, the single-phase three-level converter 50 is composed of silicon devices with high withstand voltage, or the like. By this means, the switching loss in the single-phase two-level converter 40 becomes smaller than that in the single-phase three-level converter 50, and on the other hand, the withstand voltage property of the single-phase three-level converter 50 becomes higher than that of the single-phase two-level converter 40.

Figure 2:
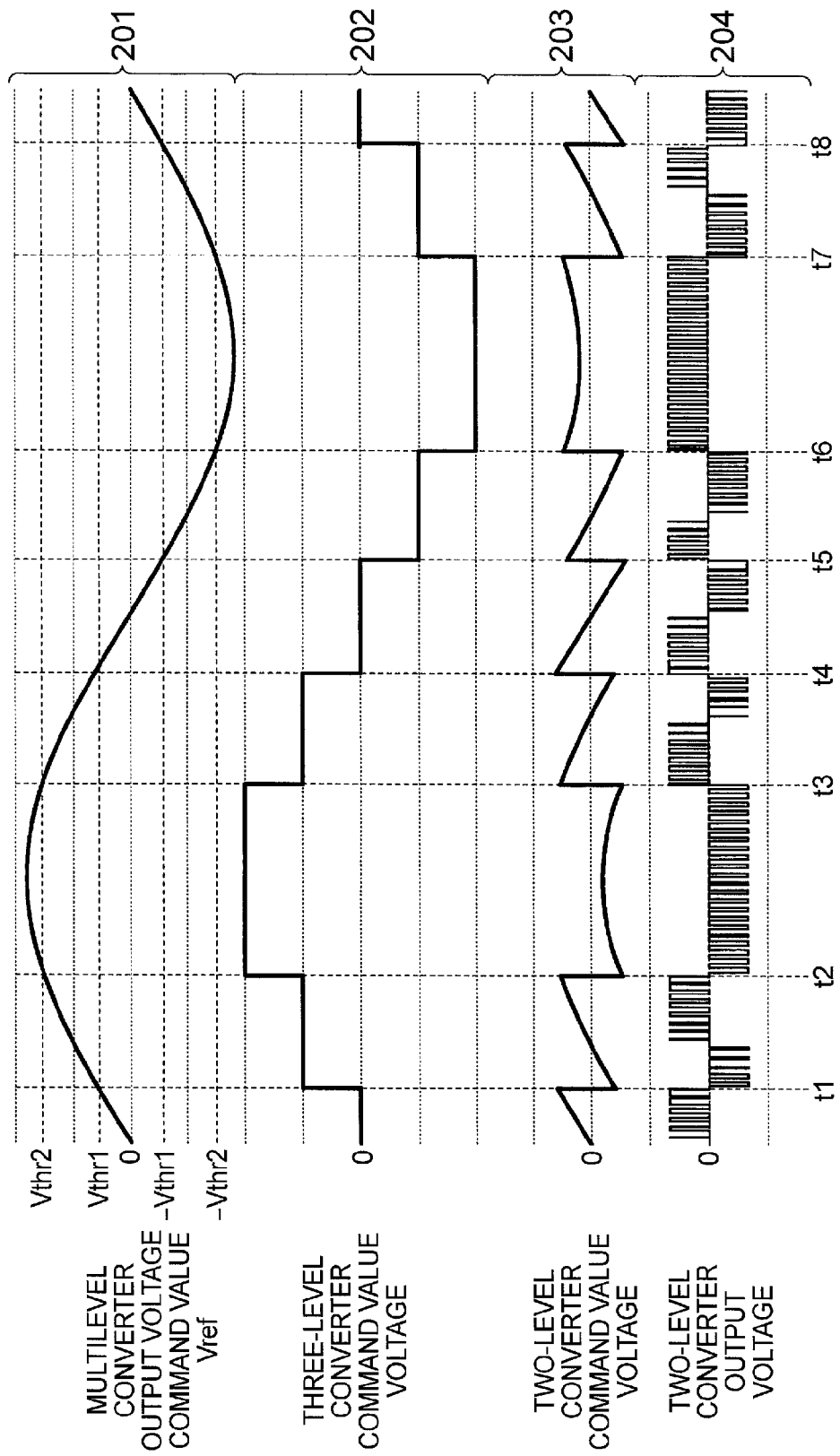
FIG. 2 is a diagram showing command value voltages of the respective converters corresponding to an output voltage instruction to the multilevel converter according to the first embodiment.

FIG. 2 is a diagram showing command value voltages of the respective converters corresponding to an output voltage instruction to the multilevel converter 1 according to the first embodiment. In FIG. 2, an output voltage command value Vref 201 of the multilevel converter 1, a command value voltage 202 of the single-phase three-level converter 50, a command value voltage 203 of the single-phase two-level converter 40, an output voltage 204 of the single-phase two-level converter 40 are shown.

That is, the power conversion apparatus 11 according to the present embodiment realizes the output voltage command value Vref 201 of the multilevel converter 1, by combining the command value voltage 202 of the single-phase three-level converter 50 and the command value voltage 203 of the single-phase two-level converter 40.

And, the power conversion apparatus 11 according to the present embodiment makes the switching frequency of the single-phase two-level converter 40 with low switching loss higher than that of the single-phase three-level converter 50, and then controls the single-phase two-level converter 40 so as to follow the detailed change of the output voltage command value Vref 201. By this means, the detail control of the voltage and the reduction in the switching loss can be realized.

Generally, devices with little switching loss, such as silicon carbide devices have low withstand voltage property, in many cases. Accordingly, in the present embodiment, in order to enable a large voltage change, it has been decided that a control to realize a staircase waveform is performed to the single-phase three-level converter 50 with high withstand voltage property.

In the present embodiment, regarding the output voltage command value Vref 201 of the multilevel converter 1, threshold values are set so that the capacitors 15a, 15b of the single-phase three-level converter 50 output. For example, voltage threshold values so that any one of the capacitors 15a, 15b of the single-phase three-level converter 50 outputs are made ±Vthr1. Furthermore, voltage threshold values so that both of the capacitors 15a, 15b of the single-phase three-level converter 50 output are made ±Vthr2. And the control unit 150 controls the switching devices 5a-5f contained in the single-phase three-level converter 50, based on whether or not the output voltage command value Vref 201 exceeds the voltage threshold values ±Vthr1 and the voltage threshold values ±Vthr2.

Furthermore, the control unit 150 controls so that the voltage of the single-phase two-level converter 40 becomes the output voltage 204 of the single-phase two-level converter 40, based on the command value voltage 203 of the single-phase two-level converter 40. Next, specific control of the switching devices will be described.

Figure 3:
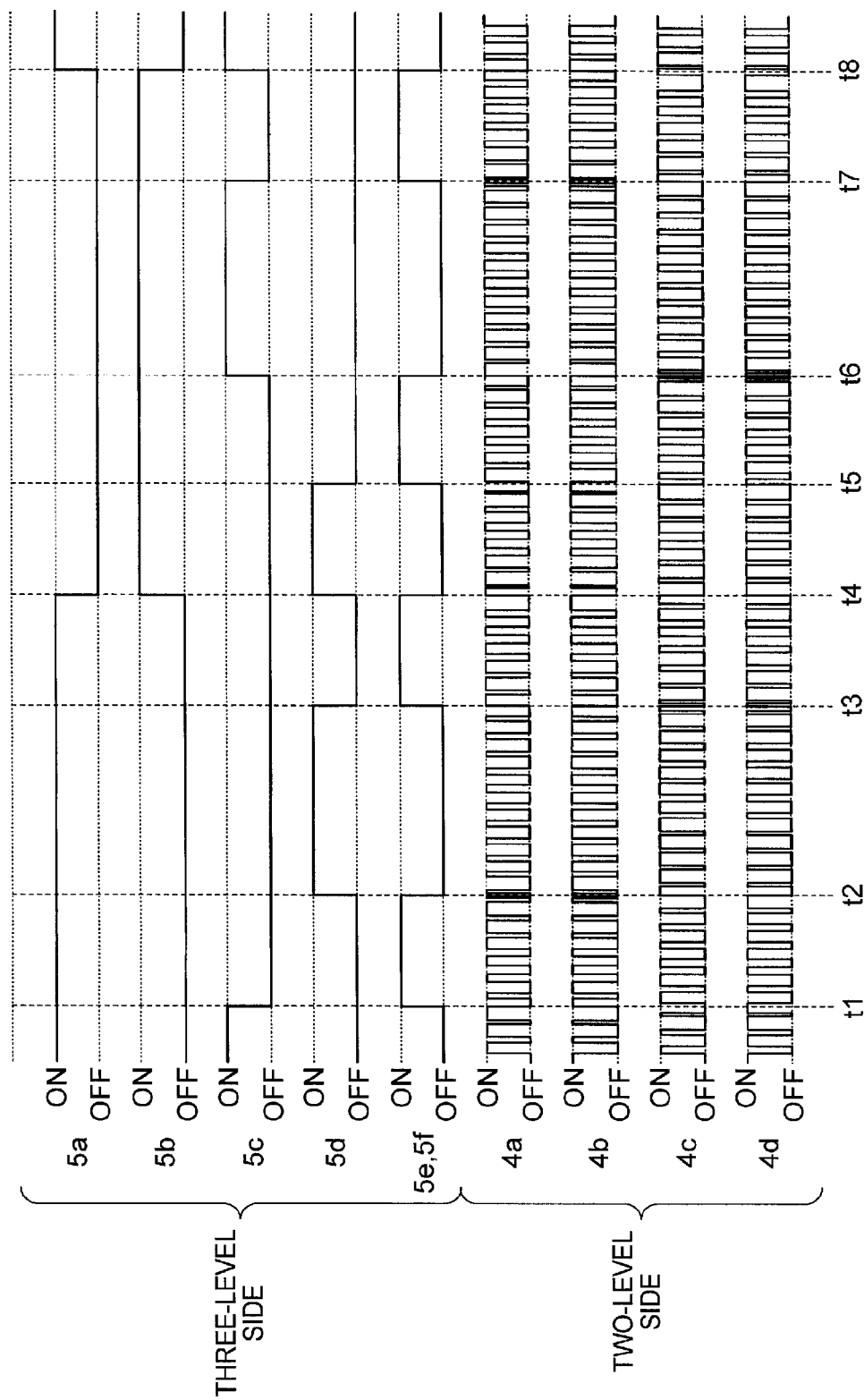
FIG. 3 is a diagram showing switching controls by the respective switching devices contained in the single-phase two-level converter and the single-phase three-level converter according to the first embodiment.

FIG. 3 is a diagram showing switching controls by the switching devices contained in the respective converters. In the example shown in FIG. 3, switching controls of the switching devices 5a-5f of the single-phase three-level converter 50 side, and switching controls of the switching devices 4a-4d of the single-phase two-level converter 40 side are shown.

And, when the condition of Vthr1≥Vref≥−Vthr1 is satisfied (time 0-time t1, time t4-time t5, on and after time t8), the control unit 150 turns any one combination in an ON state, out of the combination of the switching device 5a and the switching device 5c, and the combination of the switching device 5b and the switching device 5d. By this means, the voltage of the capacitors 15a, 15b is not superimposed on the converter output voltage, and thereby the control unit 150 outputs the output voltage command value Vref of the whole converter with the pulse width modulation control to the single-phase two-level converter 40.

Figure 4:
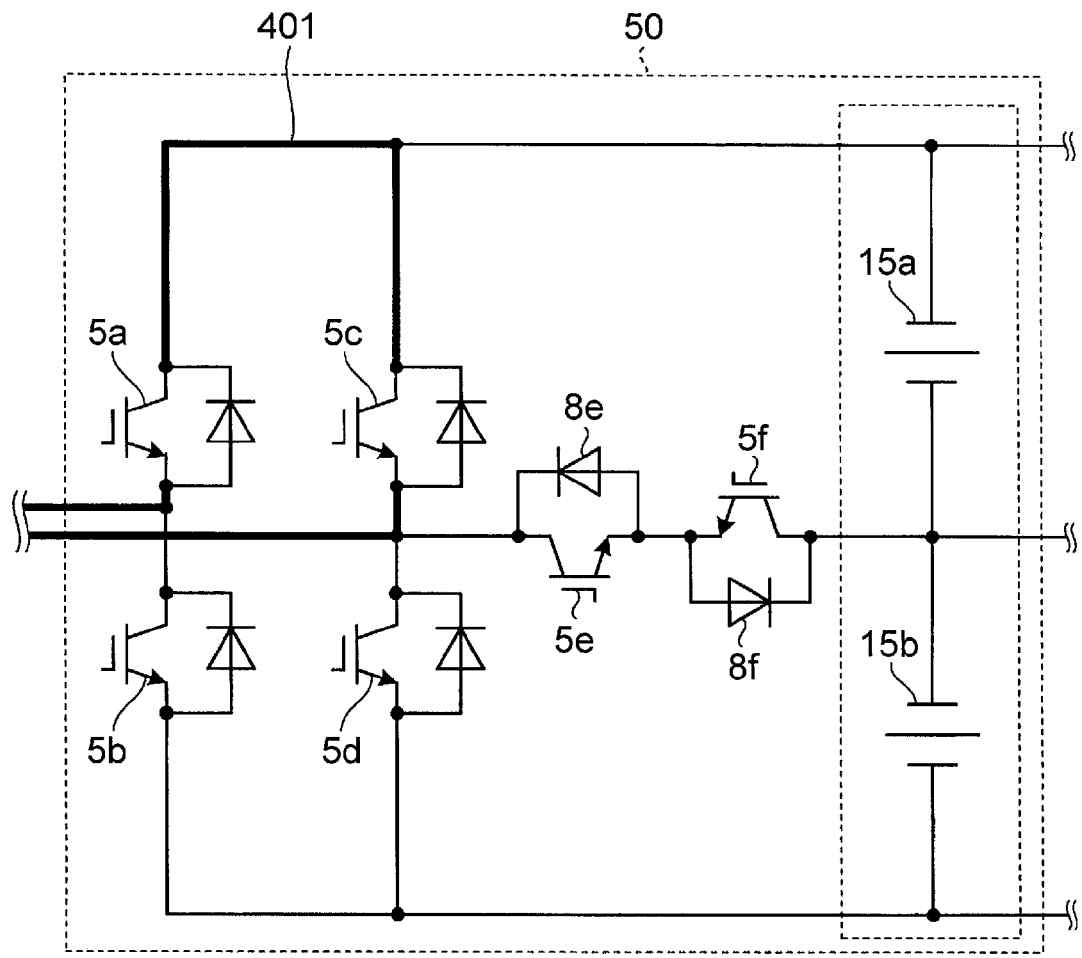
FIG. 4 is a diagram showing a flow of a current of the single-phase three-level converter of the multilevel converter, when the condition of Vthr1≥Vref≥−Vthr1 is satisfied.

FIG. 4 is a diagram showing a flow of a current of the single-phase three-level converter 50 of the multilevel converter 1, when the condition of Vthr1≥Vref≥−Vthr1 is satisfied. In the example shown in FIG. 4, the single-phase three-level converter 50 is controlled such that the combination of the switching device 5a and the switching device 5b is in an ON state, and the other switching devices 5b, 5d-5f are in an OFF state. In this case, since current flows in a route shown by a bold line 401, the voltage of the capacitors 15a, 15b is not superimposed. In addition, FIG. 4 shows an example in which only the combination of the switching device 5a and the switching device 5c are in an ON state, but only the combination of the switching device 5b and the switching device 5d may be in an ON state.

Returning to FIG. 3, when the condition of Vthr2≥Vref>Vthr1 is satisfied (time t1-time t2, time t3-time t4), the control unit 150 controls the switching devices 5a, 5e, 5f contained in the single-phase three-level converter 50 in an ON state. By this means, since the voltage of the capacitor 15a is added to the converter output voltage, the single-phase two-level converter 40 outputs a difference voltage obtained by subtracting the voltage of the capacitor 15a from the output voltage command value Vref of the whole converter, in accordance with the pulse width modulation control by the control unit 150.

Figure 5:
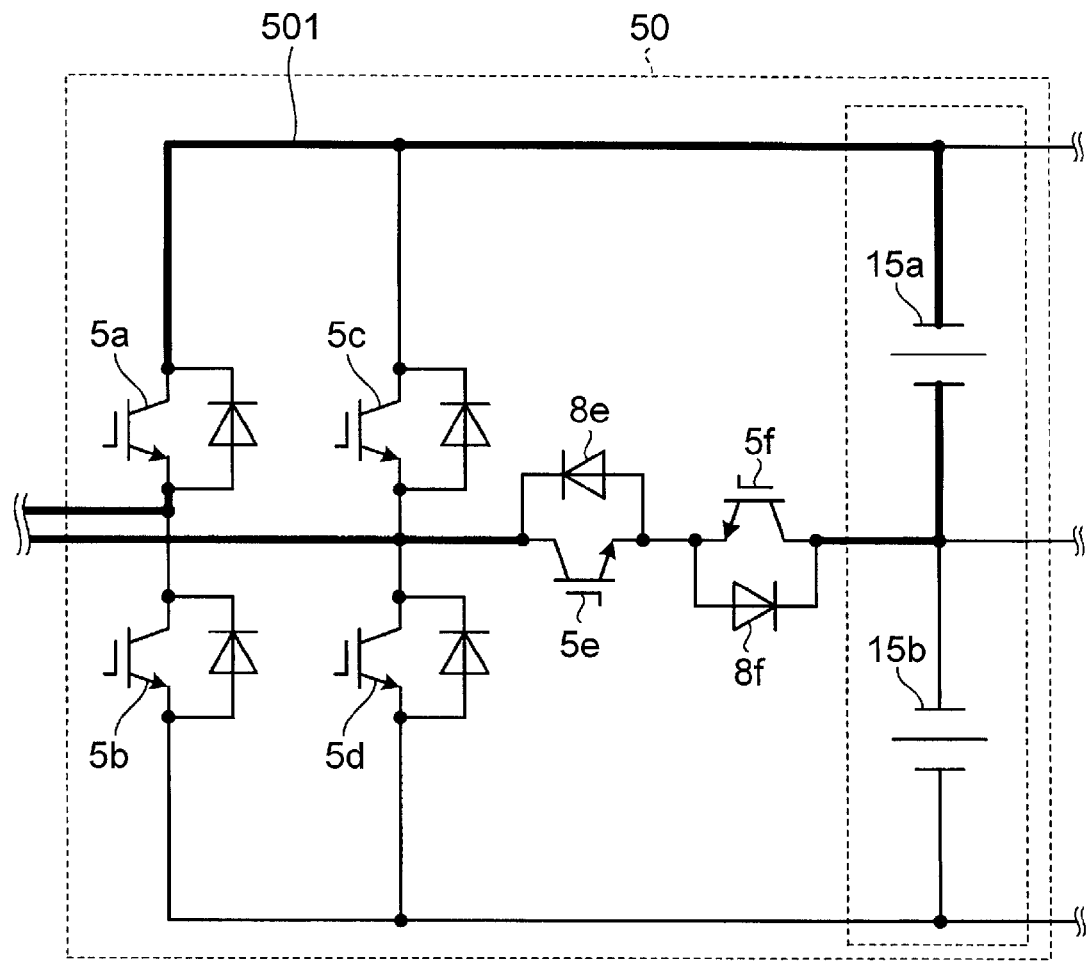
FIG. 5 is a diagram showing a flow of a current of the single-phase three-level converter of the multilevel converter, when the condition of Vthr2≥Vref≥Vthr1 is satisfied.

FIG. 5 is a diagram showing a flow of a current of the single-phase three-level converter 50 of the multilevel converter 1, when the condition of Vthr2≥Vref>Vthr1 is satisfied. In the example shown in FIG. 5, the single-phase three-level converter 50 is controlled such that the combination of the switching devices 5a, 5e, 5f is in an ON state, and the other switching devices are in an OFF state. In this case, since current flows in a route shown by a bold line 501, only the voltage of the capacitor 15a is superimposed.

Returning to FIG. 3, when the condition of Vref>Vthr2 is satisfied (time t2-time t3), the control unit 150 turns the switching devices 5a, 5d contained in the single-phase three-level converter 50 in an ON state. By this means, since the voltages of the capacitors 15a, 15b are added to the converter output voltage, the single-phase two-level converter 40 outputs a difference voltage obtained by subtracting the voltages of the capacitors 15a, 15b from the output voltage command value Vref of the whole converter, by the pulse width modulation control by the control unit 150.

Figure 6:
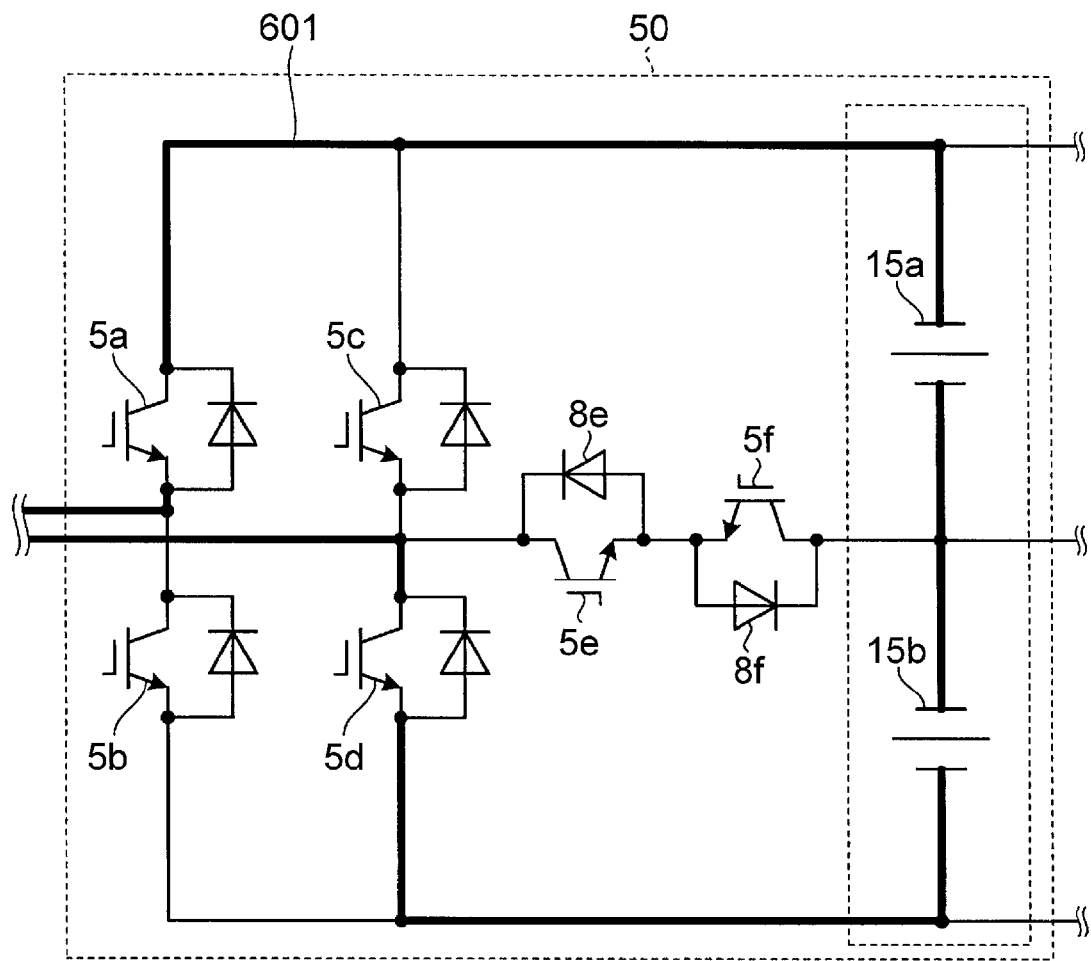
FIG. 6 is a diagram showing a flow of a current of the single-phase three-level converter of the multilevel converter, when the condition of Vref>Vthr2 is satisfied.

FIG. 6 is a diagram showing a flow of a current of the single-phase three-level converter 50 of the multilevel converter 1, when the condition of Vref>Vthr2 is satisfied. In the example shown in FIG. 6, only the combination of the switching devices 5a, and the switching device 5d is controlled in an ON state. In this case, since current flows in a route shown by a bold line 601, the voltages of the capacitors 15a, 15b are superimposed.

Returning to FIG. 3, when the condition of −Vthr1>Vref≥−Vthr2 is satisfied (time t5-time t6, time t7-time t8), the control unit 150 turns the switching devices 5b, 5e and 5f contained in the single-phase three-level converter 50 in an ON state. By this means, since the voltage of the capacitor 15b is subtracted from the converter output voltage, the single-phase two-level converter 40 outputs a difference voltage obtained by adding the voltage of the capacitor 15a to the output voltage command value Vref of the whole converter, by the pulse width modulation control by the control unit 150.

When the condition of −Vthr2>Vref is satisfied (time t6-time t7), the control unit 150 turns the switching devices 5b, and 5c contained in the single-phase three-level converter 50 in an ON state. By this means, since the voltages of the capacitors 15a, 15b are subtracted from the converter output voltage, the single-phase two-level converter 40 outputs a difference voltage obtained by adding the voltages of the capacitors 15a, 15b to the output voltage command value Vref of the whole converter, by the pulse width modulation control by the control unit 150.

In this manner, the control unit 150 according to the present embodiment controls the switching devices 5a-5f contained in the single-phase three-level converter 50 by a prescribed voltage unit (threshold values ±Vthr2, threshold value ±Vthr1). And the control unit 150 controls the switching devices 4a-4d contained in the single-phase two-level converter 40, corresponding to the change of an output voltage smaller than the prescribed voltage.

By performing the above-described control, the power conversion apparatus 11 according to the present embodiment can make the number of switching times of the respective switching devices 5a-5f of the single-phase three-level converter 50 small, such as four times, in one cycle of the converter output voltage. In addition, the present embodiment does not limit the number of switching times to four times, but the number of switching times changes according to the number of the threshold values and so on. The number of the threshold values is made small, and thereby the number of switching times can be made smaller. For example, the number of switching times may be 1 to 3 times and so on, for example.

The single-phase three-level converter 50 creates a staircase waveform which becomes a basis of the converter output voltage of the multilevel converter 1. Being composed of silicon devices, the single-phase three-level converter 50 has high withstand voltage property, but has large switching loss. However, in the present embodiment, since a staircase waveform is created, to cause the number of switching times in one cycle to be smaller. By this means, the number of switching times can be suppressed, and the switching loss can be reduced.

And, the single-phase two-level converter 40 performs high speed switching control, so as to compensate the difference voltage between the staircase waveform of the single-phase three-level converter 50 and the output voltage of the multilevel converter. In this manner, the single-phase two-level converter 40 compensates the difference voltage between the staircase waveform of the single-phase three-level converter 50 and the output voltage of the multilevel converter.

In the present embodiment, the threshold voltages Vthr1, Vthr2 are sets to appropriate values, and thereby the single-phase two-level converter 40 can be used for compensating the difference voltage, and accordingly, high withstand voltage property is not required, and switching devices with low withstand voltage property can be used. In addition, the single-phase two-level converter 40 performs high speed switching control so as to compensate the difference voltage between the stair case waveform of the single-phase three-level converter 50 and the AC input/output voltage of the whole multilevel converter 1. In the present embodiment, silicon carbide devices with small switching loss are used as the single-phase two-level converter 40, and thereby the loss by the high speed switching can be suppressed.

The single-phase three-level converter 50 uses devices with high withstand voltage property, so as to form a staircase waveform which becomes a basic of the output voltage of the multilevel converter 1. By this means, the number of converters to be connected in series can be suppressed.

Furthermore, even when silicon devices with large switching loss are used as the single-phase three-level converter 50, the number of switching times can be reduced, compared with a case in which a plurality of times of switching are performed, in a conventional pulse width modulation control system by triangular wave comparison. By this means, the loss reducing effect can be improved.

That is, silicon carbide devices are used in the single-phase two-level converter 40, to generate not only the switching loss reducing effect, but the switching loss can be reduced, in the conventional single-phase three-level converter 50 using silicon devices. By this means, the switching loss of the whole multilevel converter 1 can be more reduced.

Second Embodiment

Figure 7:
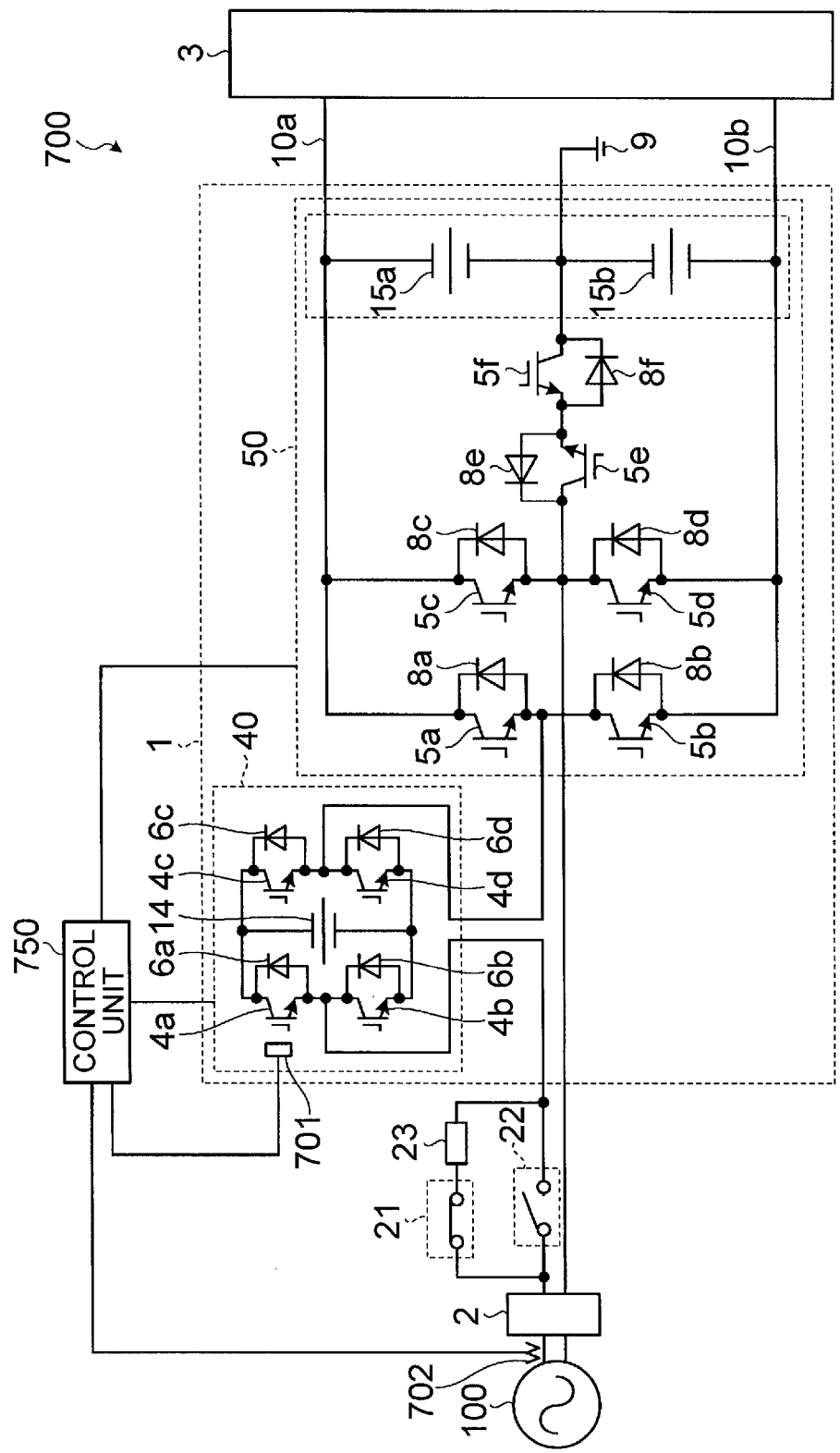
FIG. 7 is a diagram showing a configuration of a multi-level converter of a power conversion apparatus according to a second embodiment.

In a second embodiment, a case to perform initial charging to the multilevel converter 1 will be described. FIG. 7 is a diagram showing a configuration of the multilevel converter 1 of a power conversion apparatus according to a second embodiment. A power conversion apparatus 700 according to the present embodiment is further provided with a switching device 21, a switching device 22 and a resistor 23, as a configuration for performing initial charging, compared with the power conversion apparatus 11 of the first embodiment. Furthermore, in the power conversion apparatus 700 according to the present embodiment, the control unit 150 is changed to a control unit 750 with different processing, and a current detecting unit 702 and a temperature detecting unit 701 are added.

The current detecting unit 702 detects a value of the current flowing through the multilevel converter 1. The temperature detecting unit 701 measures the temperature of the single-phase two-level converter 40. In addition, in the present embodiment, a temperature detecting unit so as to measure the temperature of the single-phase three-level converter 50 may be provided.

The control unit 750 performs the same control as the control unit 150 according to the first embodiment, and in addition, performs control so as to perform initial charging. The control unit 750 according to the present embodiment performs control at the time of initial charging, in consideration of the current value detected by the current detecting unit 702, and the temperature detected by the temperature detecting unit 701.

The switching device 21 is turned in an ON state at the time of performing the initial charging. In addition, the switching device 22 is turned in an ON state, when the voltage is outputted to the main motor 3. The resistor 23 is provided not to damage the devices at the time of charging.

Incidentally, at the time of initial charging, the charging of the capacitor 14 and charging of the capacitors 15a, 15b may be simultaneously performed, while they are connected in series, but there is a case in which it is difficult to charge all of the capacitor 14, and the capacitors 15a, 15b to the voltage peak values, because of the difference in electrostatic capacitances thereof.

Accordingly, in the present embodiment, an example is used in which the control unit 750 charges the capacitors 15a, 15b to the desired voltage values, and then charges the capacitor 14 to the desired voltage value. The present embodiment does not limit the charging order, and for example, the capacitor 14 is firstly charged, and then the capacitors 15a, 15b may be charged.

Figure 8:
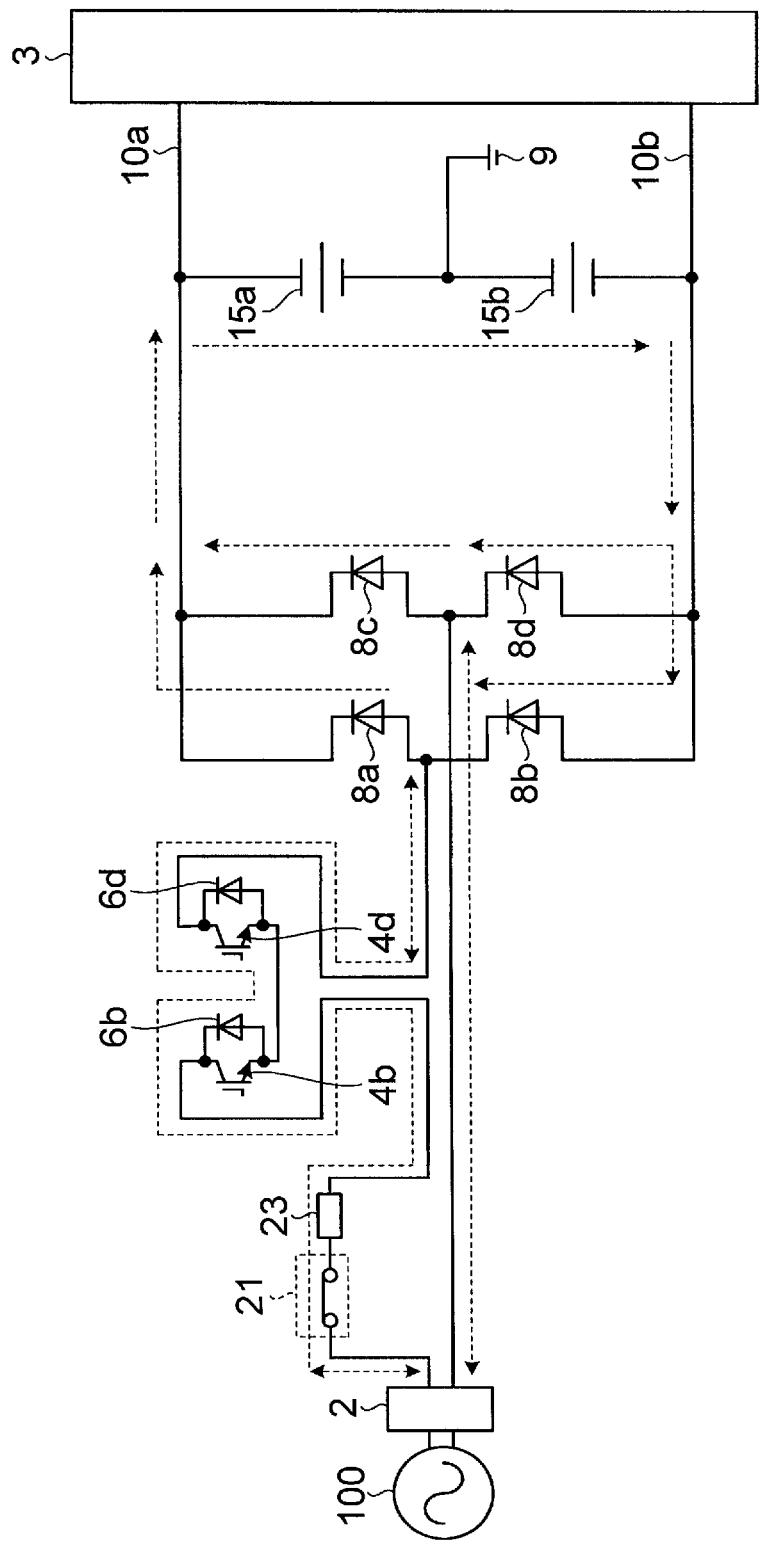
FIG. 8 is a diagram showing a flow of a current in the case of charging the two series-connected capacitors contained in the single-phase three-level converter according to the second embodiment.

FIG. 8 is a diagram showing a flow of a current in the case of charging the two series connected capacitors 15a, 15b contained in the single-phase three-level converter 50. In the example shown in FIG. 8, the control unit 750 performs control to turn the switching device 4b and the switching device 4d in an ON state, and performs control to turn the other switching devices (the switching devices 4a, 4c, the all switching devices 5a-5f contained in the single-phase three-level converter 50) in an OFF state.

By this means, in the power conversion apparatus 700 according to the present embodiment, current shown by a dotted line of FIG. 8 flows. As a result, the charging is performed to the capacitors 15a, 15b, and the charging is not performed to the capacitor 14.

Figure 9:
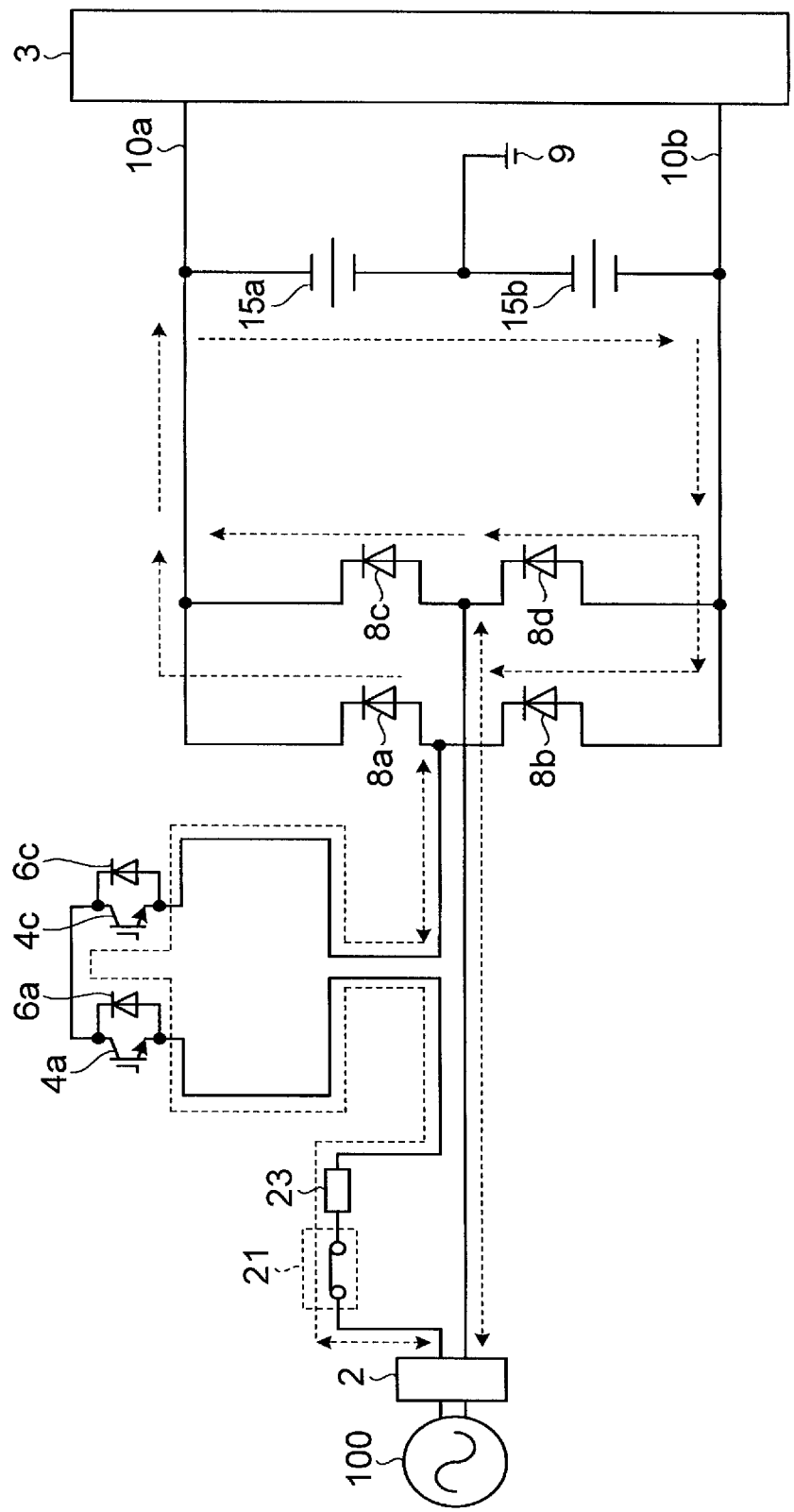
FIG. 9 is a diagram showing a flow of a current in the case of charging the two series-connected capacitors contained in the single-phase three-level converter according to the second embodiment.

FIG. 9 is a diagram showing a flow of a current in the case of charging the two series connected capacitors 15a, 15b contained in the single-phase three-level converter 50. In the example shown in FIG. 9, the control unit 750 performs control to turn the switching device 4a and the switching device 4c in an ON state, and performs control to turn the other switching devices (the switching devices 4b, 4d, the all switching devices 5a-5f contained in the single-phase three-level converter 50) in an OFF state.

By this means, in the power conversion apparatus 700 according to the present embodiment, current shown by a dotted line of FIG. 9 flows. As a result, the charging is performed to the capacitors 15a, 15b, and the charging is not performed to the capacitor 14.

In this manner, the control unit 750 according to the present embodiment performs control to turn any one combination in an ON state, out of the combination of the switching device 4a, and the switching device 4c, and the combination of the switching device 4b, and the switching device 4d. The control like this is performed, and thereby the capacitors 15a, 15b are charged to at most the voltage peak value of the AC power source 100, through the reflux diodes 6a-6d.

The present embodiment does not limit which combination is turned in an ON state, out of the combination of the switching device 4a and the switching device 4c, and the combination of the switching device 4b and the switching device 4d.

Which combination to be turned in an ON state may be switched, out of the combination of the switching device 4a and the switching device 4c, and the combination of the switching device 4b and the switching device 4d, in consideration of the loss of each of the switching devices.

Accordingly, it has been decided that the control unit 750 according to the present embodiment switches which combination to be turned in an ON state, out of the combination of the switching device 4a and the switching device 4c, and the combination of the switching device 4b and the switching device 4d, based on the current value detected by the current detecting unit 702, and the temperature detected by the temperature detecting unit 701. It has been decided that the control unit 750 according to the present embodiment performs control to turn the combination which has been utilized till now in an OFF state, and to turn the other combination in an ON state, when the current value detected by the current detecting unit 702, or the temperature detected by the temperature detecting unit 701 exceeds a predetermined threshold value.

And, when the capacitors 15a, 15b reach the desired voltage values before reaching the peak values, the control unit 750 starts control to charge the capacitor 14.

Figure 10:
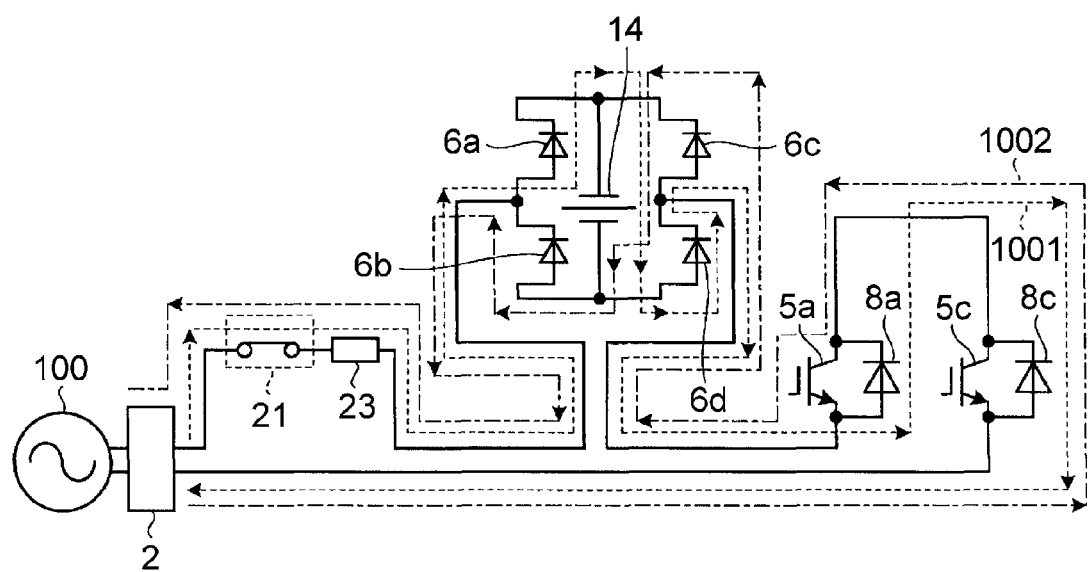
FIG. 10 is a diagram showing a flow of a current in the case of charging the capacitor contained in the single-phase two-level converter according to the second embodiment.

FIG. 10 is a diagram showing a flow of a current in the case of charging the capacitor 14 contained in the single-phase two-level converter 40. In the example shown in FIG. 10, the control unit 750 performs control to turn the switching device 5a and the switching device 5c in an ON state, and performs control to turn the other switching devices (the all switching devices 4a-4d contained in the single-phase two-level converter 40, the switching devices 5b, 5d-5f) in an OFF state.

By this means, in the power conversion apparatus 700 according to the present embodiment, AC currents shown by a dotted line 1001 and a chain line 1002 of FIG. 10 flow. As a result, the charging is performed to the capacitor 14, and the charging is not performed to the capacitors 15a, 15b.

Figure 11:
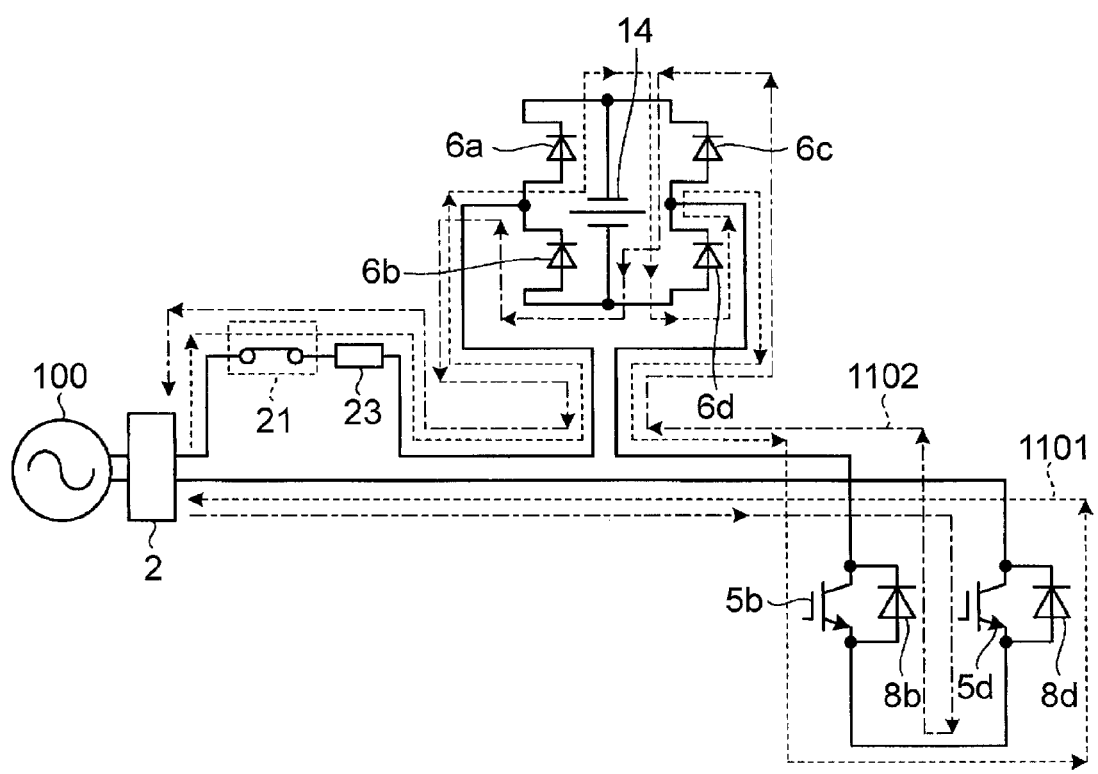
FIG. 11 is a diagram showing a flow of a current in the case of charging the capacitor contained in the single-phase two-level converter according to the second embodiment.

FIG. 11 is a diagram showing a flow of a current in the case of charging the capacitor 14 contained in the single-phase two-level converter 40. In the example shown in FIG. 11, the control unit 750 performs control to turn the switching device 5b and the switching device 5d in an ON state, and performs control to turn the other switching devices (the all switching devices 4a-4d contained in the single-phase two-level converter 40, the switching devices 5a, 5c, 5e-5f) in an OFF state.

By this means, in the power conversion apparatus 700 according to the present embodiment, AC currents shown by a dotted line 1101 and a chain line 1102 of FIG. 11 flow. As a result, the charging is performed to the capacitor 14, and the charging is not performed to the capacitors 15a, 15b.

In this manner, the control unit 750 according to the present embodiment performs control to turn any one combination in an ON state, out of the combination of the switching device 5a and the switching device 5c, and the combination of the switching device 5b and the switching device 5d. By performing the control like this, the capacitor 14 is charged to at most the voltage peak value of the AC power source 100, through the reflux diodes 8a-8d.

The present embodiment does not limit which combination is turned in an ON state, out of the combination of the switching device 5a and the switching device 5c, and the combination of the switching device 5b and the switching device 5d.

Furthermore, which combination to be turned in an ON state may be switched, out of the combination of the switching device 5a and the switching device 5c, and the combination of the switching device 5b and the switching device 5d, in consideration of the loss of each of the switching devices.

Accordingly, it has been decided that the control unit 750 according to the present embodiment switches which combination to be turned in an ON state, out of the combination of the switching device 5a and the switching device 5c, and the combination of the switching device 5b and the switching device 5d, based on the current value detected by the current detecting unit 702. It has been decided that the control unit 750 according to the present embodiment performs control to turn the combination which has been utilized till now in an OFF state, and to turn the other combination in an ON state, when the current value (further, may be the temperature detected from the single-phase three-level converter 50) detected by the current detecting unit 702 exceeds a predetermined threshold value.

The capacitor 14 is charged to at most the voltage peak value of the AC power source 100, through the reflux diodes 8a-8d. When the capacitor 14 reaches the desired voltage value before reaching the peak value, the control is transferred to a control so as to operate the main motor 3. The control at that time will be omitted, since it is described in the first embodiment.

Figure 12:
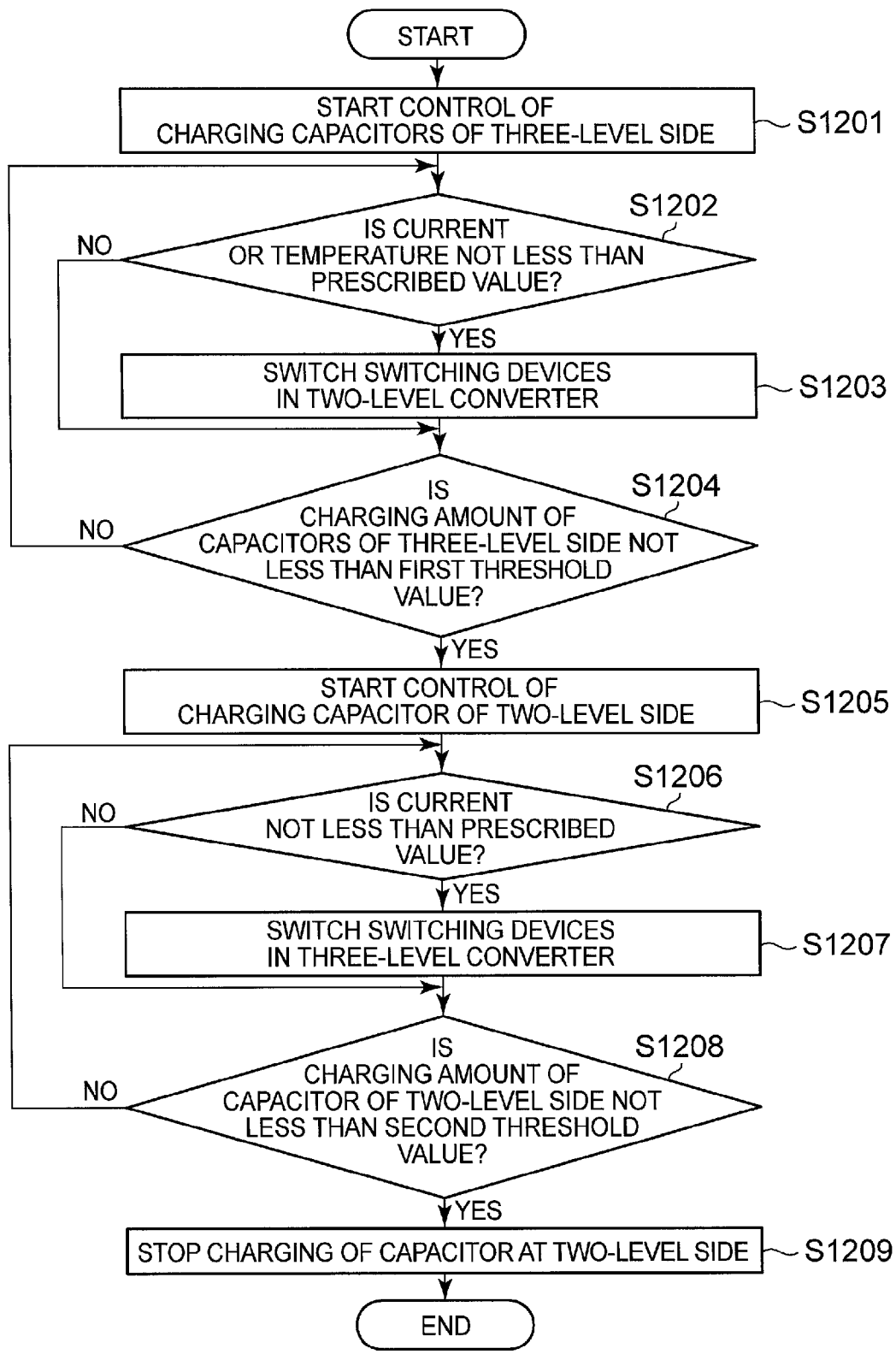
FIG. 12 is a flow chart showing a procedure of a processing procedure of charging the capacitors in the power conversion apparatus according to the present embodiment.

Next, a processing procedure of charging capacitors in the power conversion apparatus 700 according to the present embodiment will be described. FIG. 12 is a flow chart showing a procedure of the above-described processing in the power conversion apparatus 700 according to the present embodiment.

To begin with, the control unit 750 starts charging the capacitors 15a, 15b of the single-phase three-level converter 50 (step S1201). The charging method is the method shown in FIG. 8 or FIG. 9. For this purpose, the control unit 750 performs control to turn any one combination in an ON state, out of the combination of the switching device 4a and the switching device 4c, and the combination of the switching device 4b and the switching device 4d, which are contained in the single-phase two-level converter 40. In addition, the all switching devices 5a-5f are turned in an OFF state.

Next, the control unit 750 determines whether or not the current detected by the current detecting unit 702, or the temperature detected by the temperature detecting unit 701 is not less than a prescribed threshold value (step S1202). In addition, the threshold value is set in accordance with an actual aspect. When it is determined that the current or the temperature is smaller than the threshold value (step S1202: No), the processing transits to a step S1204 without particularly performing a processing.

On the other hand, when the control unit 750 determines that the current or the temperature is not less than the prescribed threshold value (step S1202: Yes), the control unit 750 switches the combination of the switching devices to be turned in an ON state, in the single-phase two-level converter 40 (step S1203). In the present embodiment, the combination is switched to the combination of the switching device 4a and the switching device 4c, or to the combination of the switching device 4b and the switching device 4d.

Then, the control unit 750 determines whether or not the voltage values of the capacitors 15a, 15b of the single-phase three-level converter 50 are not less than a first threshold value (step S1204). And when the control unit 750 determines that the voltage values are smaller than the first threshold value (step S1204: No), the control unit 750 performs processing from the processing of the step S1202.

On the other hand, when the control unit 750 determines that the voltage values of the capacitors 15a, 15b of the single-phase three-level converter 50 are not less than the first threshold value (desired voltage value) (step S1204: Yes), it is decided that the charging of the capacitors 15a, 15b of the three-level side has been finished.

And the control unit 750 starts charging the capacitor 14 of the single-phase two-level converter 40 (step S1205). The charging method is the method shown in FIG. 10 or FIG. 11. For this purpose, the control unit 750 performs control to turn any one combination in an ON state, out of the combination of the switching device 5a and the switching device 5c, and the combination of the switching device 5b and the switching device 5d, which are contained in the single-phase three-level converter 50. In addition, the all switching devices 4a-4d of the single-phase two-level converter 40 are turned in an OFF state.

Next, the control unit 750 determines whether or not the current detected by the current detecting unit 702 (or may be the temperature detected from the single-phase three-level converter 50) is not less than a prescribed threshold value (step S1206). In addition, the threshold value is set in accordance with an actual aspect. When it is determined that the current is smaller than the threshold value (step S1206: No), the processing transits to a step S1209 without particularly performing a processing.

On the other hand, when the control unit 750 determines that the current is not less than the prescribed threshold value (step S1206: Yes), the control unit 750 switches the combination of the switching devices to be turned in an ON state (step S1207). In the present embodiment, the combination is switched to the combination of the switching device 5a and the switching device 5c, or to the combination of the switching device 5b and the switching device 5d.

Then, the control unit 750 determines whether or not the voltage value of the capacitor 14 of the single-phase two-level converter 40 is not less than a second threshold value (a desired voltage value) (step S1208). And when the control unit 750 determines that the voltage value is smaller than the second threshold value (step S1208: No), the control unit 750 performs processing from the processing of the step S1206.

On the other hand, when the control unit 750 determines that the voltage value of the capacitor 14 of the single-phase two-level converter 40 is not less than the second threshold value (step S1208: Yes), it is decided that the charging of the capacitor 14 of the two-level side has been finished (step S1209).

With the above-described method, the control unit 750 is enabled to perform charging control of the capacitor 14 of the single-phase two-level converter 40, and the capacitors 15a, 15b of the single-phase three-level converter 50.

The power conversion apparatus according to the second embodiment can realize the reduction of the loss of the main circuit, by performing the above-described charging method.

As described above, according to the first to second embodiments, it is possible to realize a multilevel circuit system which can output multilevel voltages, while the number of components of the switching devices and the capacitors is made smaller than a conventional apparatus. In addition, the number of the components is reduced, and thereby effecting cooling is facilitated. The cooling is facilitated, to allow a margin, and to enable miniaturization.

In addition, according to the first and second embodiments, it is possible to further reduce the switching loss of the whole multilevel converter 1.

In the present embodiment, a single-phase two-phase converter is exemplified as an a pulse width modulation unit, but without being limited to this, a single-phase three-level converter and a single-phase converter with four or more levels may be used.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus for a vehicle comprising:
a single-phase two-level converter comprising a capacitor, a first controllable switching device connected between one end of the capacitor and one AC input/output point, a second controllable switching device connected between other end of the capacitor and the one AC input/output point, a third controllable switching device connected between the one end of the capacitor and other AC input/output point, a fourth controllable switching device connected between the other end of the capacitor and the other AC input/output point, and diodes connected in antiparallel with the controllable switching devices, respectively; and
a single-phase three-level converter comprising two series-connected capacitors, a fifth controllable switching device connected between one end of the two series-connected capacitors and one AC input/output point, a sixth controllable switching device connected between other end of the two series-connected capacitors and the one AC input/output point, a seventh controllable switching device connected between the one end of the two series-connected capacitors and other AC input/output point, an eighth controllable switching device connected between the other end of the two series-connected capacitors and the other AC input/output point, a bidirectional switch connected between a connection point between the two series-connected capacitors and the other AC input/output point in which a ninth controllable switching device and a tenth controllable switching device are connected in antiparallel with and in reverse polarities to each other, and diodes connected in antiparallel with the controllable switching devices, respectively;

the single-phase two-level converter and the single-phase three-level converter being connected in series at the AC input/output points; and the single-phase two-level converter having smaller switching loss than the single-phase three-level converter, and the single-phase three-level converter having higher withstand voltage property than the single-phase two-level converter.

2. The power conversion apparatus for a vehicle according to claim 1, wherein the controllable switching devices contained in the single-phase two-level converter have higher switching frequency than the controllable switching devices contained in the single-phase three-level converter.

3. The power conversion apparatus for a vehicle according to claim 2, further comprising control means which controls the controllable switching devices contained in the single-phase three-level converter by a prescribed voltage unit, and controls the controllable switching devices contained in the single-phase two-level converter, corresponding to a change of an output voltage smaller than the prescribed voltage unit.

4. The power conversion apparatus for a vehicle according to claim 1, wherein SiC (silicon carbide) devices are used in the single-phase two-level converter.

5. The power conversion apparatus for a vehicle according to claim 3, wherein the control means turns any one combination in an ON state, out of a combination of the first controllable switching device and the third controllable switching device, and a combination of the second controllable switching device and the fourth controllable switching device, which are provided in the single-phase two-level converter, and turns the all controllable switching devices provided in the single-phase three-level converter in an OFF state, and performs charging till the two series-connected capacitors in the single-phase three-level converter become a first desired voltage value.

6. The power conversion apparatus for a vehicle according to claim 5, wherein the control means switches the combination of the switching devices contained in the single-phase two-level converter which are to be turned in an ON state, based on a current flowing through the power conversion apparatus, or a temperature generated by the single-phase two-level converter.

7. The power conversion apparatus for a vehicle according to claim 1, wherein the control means turns any one combination in an ON state, out of a combination of the fifth controllable switching device and the seventh controllable switching device, and a combination of the sixth controllable switching device, which are provided in the single-phase three-level converter and the eighth controllable switching device, and turns the all controllable switching devices provided in the single-phase two-level converter in an OFF state, and performs charging till the capacitor connected in the single-phase two-level converter becomes a second desired voltage value.

8. The power conversion apparatus for a vehicle according to claim 7, wherein the control means switches the combination of the switching devices contained in the single-phase three-level converter which are to be turned in an ON state, based on a current flowing through the power conversion apparatus, or a temperature generated by the single-phase two-level converter.

9. A vehicle comprising:
a power conversion apparatus comprising, a single-phase two-level converter comprising a capacitor, a first controllable switching device connected between one end of the capacitor and one AC input/output point, a second controllable switching device connected between other end of the capacitor and the one AC input/output point, a third controllable switching device connected between the one end of the capacitor and other AC input/output point, a fourth controllable switching device connected between the other end of the capacitor and the other AC input/output point, and diodes connected in antiparallel with the controllable switching devices, respectively, and a single-phase three-level converter comprising two series-connected capacitors, a fifth controllable switching device connected between one end of the two series-connected capacitors and one AC input/output point, a sixth controllable switching device connected between other end of the two series-connected capacitors and the one AC input/output point, a seventh controllable switching device connected between the one end of the two series-connected capacitors and other AC input/output point, an eighth controllable switching device connected between the other end of the two series-connected capacitors and the other AC input/output point, a bidirectional switch connected between a connection point between the two series-connected capacitors and the other AC input/output point in which a ninth controllable switching device and a tenth controllable switching device are connected in antiparallel with and in reverse polarities to each other, and diodes connected in antiparallel with the controllable switching devices, respectively, the single-phase two-level converter and the single-phase three-level converter being connected in series at the AC input/output points, and the single-phase two-level converter having smaller switching loss than the single-phase three-level converter, and the single-phase three-level converter having higher withstand voltage property than the single-phase two-level converter; and
a main motor to which the power converted by the power conversion apparatus is supplied.

10. A power conversion apparatus for a vehicle comprising:
a pulse width modulation unit connected to an AC power source and composed of a plurality of switching devices, a plurality of diode and a capacitor;
a single-phase three-level converter which is connected in series with the pulse width modulation unit at an input side, and connected to a main motor at an output side, the single-phase three-level converter comprising, two series-connected capacitors, a fifth switching device connected between one end of the two series-connected capacitors and one AC input/output point, a sixth switching device connected between other end of the two series-connected capacitors and the one AC input/output point, a seventh switching device connected between the one end of the two series-connected capacitors and other AC input/output point, an eighth switching device connected between the other end of the two series-connected capacitors and the other AC input/output point, a bidirectional switch connected between a connection point between the two series-connected capacitors and the other AC input/output point, and diodes connected in antiparallel with the controllable switching devices, respectively; and a control unit which controls the switching devices contained in the single-phase three-level converter, based on whether or not an output voltage command value of the single-phase three-level converter exceeds a first voltage threshold value so that a voltage of any one of the two capacitors of the single-phase three-level converter is outputted, and a second voltage threshold value so that both voltages of the two capacitors of the single-phase three-level converter are outputted.

11. The power conversion apparatus for a vehicle according to claim 10, wherein the control unit further controls so that a difference voltage obtained by subtracting voltages of the two capacitors from the output voltage command value of the single-phase three-phase converter is outputted by the pulse width modulation unit.

12. The power conversion apparatus for a vehicle according to claim 10, wherein the pulse width modulation unit is composed of a capacitor, a first controllable switching device connected between one end of the capacitor and one AC input/output point, a second controllable switching device connected between other end of the capacitor and the one AC input/output point, a third controllable switching device connected between the one end of the capacitor and other AC input/output point, a fourth controllable switching device connected between the other end of the capacitor and the other AC input/output point, and diodes connected in antiparallel with the controllable switching devices, respectively.

13. The power conversion apparatus for a vehicle according to claim 10, wherein the switching devices contained in the pulse width modulation unit have higher switching frequency than the switching devices contained in the single-phase three-level converter.

14. The power conversion apparatus for a vehicle according to claim 11, wherein the control unit controls the switching devices contained in the single-phase three-level converter by a prescribed voltage unit, and controls the pulse width modulation unit, corresponding to a change of an output voltage smaller than the prescribed voltage unit.

15. The power conversion apparatus for a vehicle according to claim 10, wherein SiC (silicon carbide) devices are used in the pulse width modulation unit.

16. The power conversion apparatus for a vehicle according to claim 12, wherein the control unit turns any one combination in an ON state, out of a combination of the first controllable switching device and the third controllable switching device, and a combination of the second controllable switching device and the fourth controllable switching device, which are provided in the pulse width modulation unit, and turns the all controllable switching devices provided in the single-phase three-level converter in an OFF state, and performs charging till the two series-connected capacitors in the single-phase three-level converter become a first desired voltage value.

17. The power conversion apparatus for a vehicle according to claim 10, wherein the control unit switches the combination of the switching devices contained in the pulse width modulation unit, which are to be turned in an ON state, based on a current flowing through the power conversion apparatus, or a temperature generated by the single-phase two-level converter.

18. The power conversion apparatus for a vehicle according to claim 10, wherein the control unit turns any one combination in an ON state, out of a combination of the fifth switching device and the seventh switching device, and a combination of the sixth switching device and the eighth switching device, which are provided in the single-phase three-level converter, and turns the all switching devices provided in the pulse width modulation unit in an OFF state, and performs charging till the capacitor connected in the pulse width modulation unit becomes a second desired voltage value.

19. The power conversion apparatus for a vehicle according to claim 18, wherein the control means switches the combination of the switching devices contained in the single-phase three-level converter which are to be turned in an ON state, based on a current flowing through the power conversion apparatus, or a temperature generated by the single-phase two-level converter.

* * * * *